United States Patent
Tran

(10) Patent No.: US 8,660,491 B1
(45) Date of Patent: Feb. 25, 2014

(54) RF-BASED SYSTEM FOR CLOSE-PROXIMITY DATA AND ENERGY TRANSFER

(75) Inventor: Nghia X. Tran, San Diego, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 564 days.

(21) Appl. No.: 13/019,881

(22) Filed: Feb. 2, 2011

(51) Int. Cl.
*H04B 7/00* (2006.01)

(52) U.S. Cl.
USPC .......................................... 455/41.2; 455/41.1

(58) Field of Classification Search
USPC ................. 455/41.2, 41.1; 320/108; 340/10.1
See application file for complete search history.

(56) References Cited

U.S. PATENT DOCUMENTS

| | | | |
|---|---|---|---|
| 2007/0247768 A1* | 10/2007 | Meehleder et al. | 361/42 |
| 2008/0272889 A1* | 11/2008 | Symons | 340/10.1 |
| 2010/0093428 A1* | 4/2010 | Mattice et al. | 463/25 |
| 2011/0031928 A1* | 2/2011 | Soar | 320/108 |
| 2011/0057891 A1* | 3/2011 | Ham et al. | 345/173 |
| 2011/0124983 A1* | 5/2011 | Kroll et al. | 600/302 |
| 2011/0321118 A1* | 12/2011 | Boldyrev et al. | 726/1 |
| 2012/0077552 A1* | 3/2012 | Bessa et al. | 455/573 |
| 2012/0206097 A1* | 8/2012 | Soar | 320/108 |

* cited by examiner

*Primary Examiner* — Nay A Maung
*Assistant Examiner* — Erica Fleming-Hall
(74) *Attorney, Agent, or Firm* — Ryan J. Friedl; Kyle Eppele

(57) ABSTRACT

A wireless data and energy transfer system includes transmitting and receiving devices. The transmitting device includes a transmitting device controller and an RF transceiver, a proximity sensor, and a memory module each connected to the transmitting device controller, and a transmitting antenna connected to the RF transceiver and having a diagonal dimension, D. The receiving device includes a receiving device controller, an RF memory module connected to the receiving device controller, and a memory antenna connected to the RF memory module. The transmitting device controller is configured to simultaneously transfer data from the memory module to the RF memory module and RF energy from the transmitting antenna to the memory antenna when the proximity sensor senses the receiving device within a distance less than or equal to the distance D from the transmitting device.

15 Claims, 4 Drawing Sheets

RF-BASED SYSTEM FOR CLOSE-PROXIMITY DATA AND ENERGY TRANSFER

FEDERALLY-SPONSORED RESEARCH AND DEVELOPMENT

The RF-Based System for Close-Proximity Data and Energy Transfer is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-2778; email ssc_pac_T2@navy.mil. Reference Navy Case Number 100729.

BACKGROUND

In certain situations, it is neither possible nor convenient to capture information in a rapid and efficient manner. For example, a student on a guided tour of an art museum may not be able to write down all of the information about a particular painting or sculpture and keep pace with the tour. An efficient and reliable system for rapidly transferring data at close-proximity is desirable. Further, a system incorporating a portable device that does not rely upon a chargeable battery is also desirable, as in many circumstances, a user may not have the time or capability to recharge a dead battery.

DETAILED DESCRIPTION OF SOME EMBODIMENTS

Figure 1:
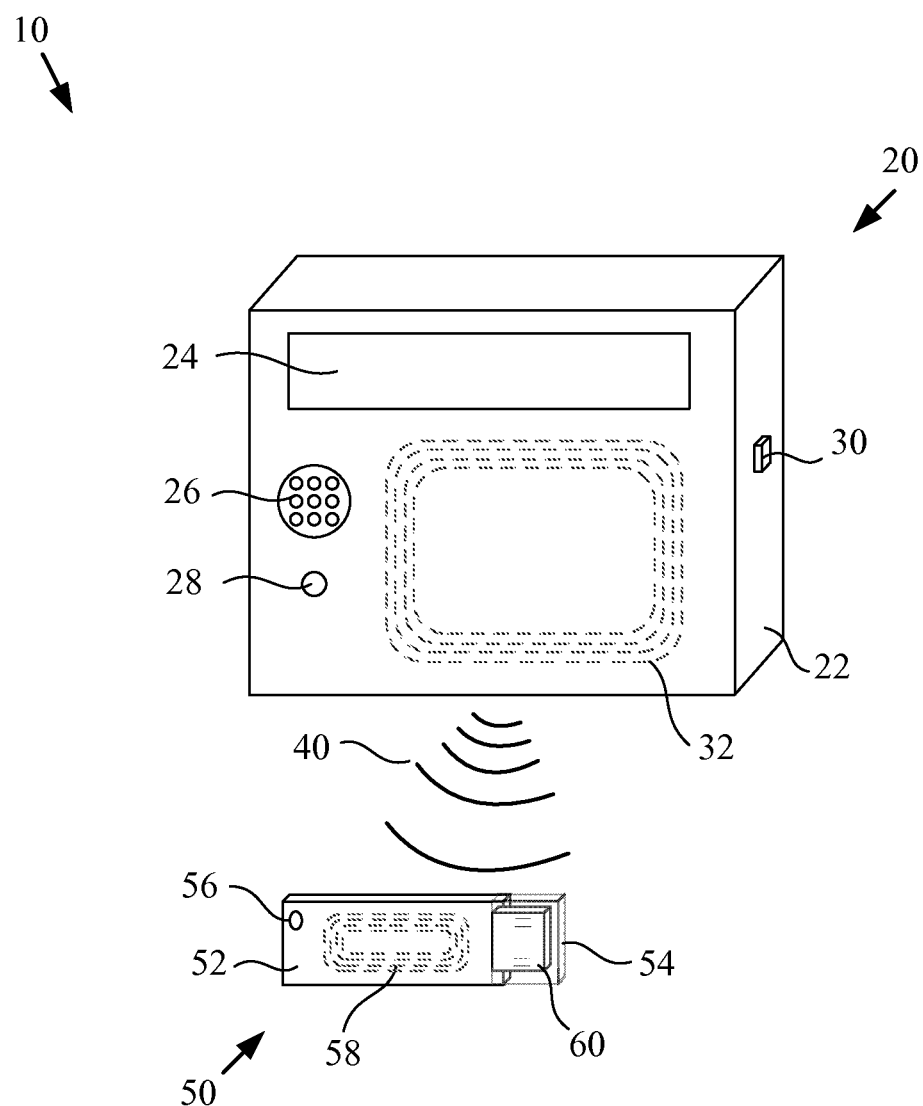
FIG. 1 shows a diagram of an embodiment of a system in accordance with the RF-Based System for Close-Proximity Data and Energy Transfer.

FIG. 1 shows a diagram of an embodiment of a system 10 in accordance with the RF-Based System for Close-Proximity Data and Energy Transfer. System 10 includes a a transmitting device 20 and a receiving device 50. Transmitting device 20 may include a transmitting device housing 22, transmitting device display 24, speaker 26, proximity sensor 28, button 30, and antenna 32. Transmitting device display 24, speaker 26, and button 30 provide an audio/visual interface of the transfer of data from transmitting device 20 as well as the operation status of transmitting device 20. Proximity sensor 28 may be an optical, capacitive, inductive, or RF based sensor and serves to detect the presence of receiving device 50. Antenna 32 and its internal electronic circuits are designed to transfer data and RF energy effectively.

Figure 2:
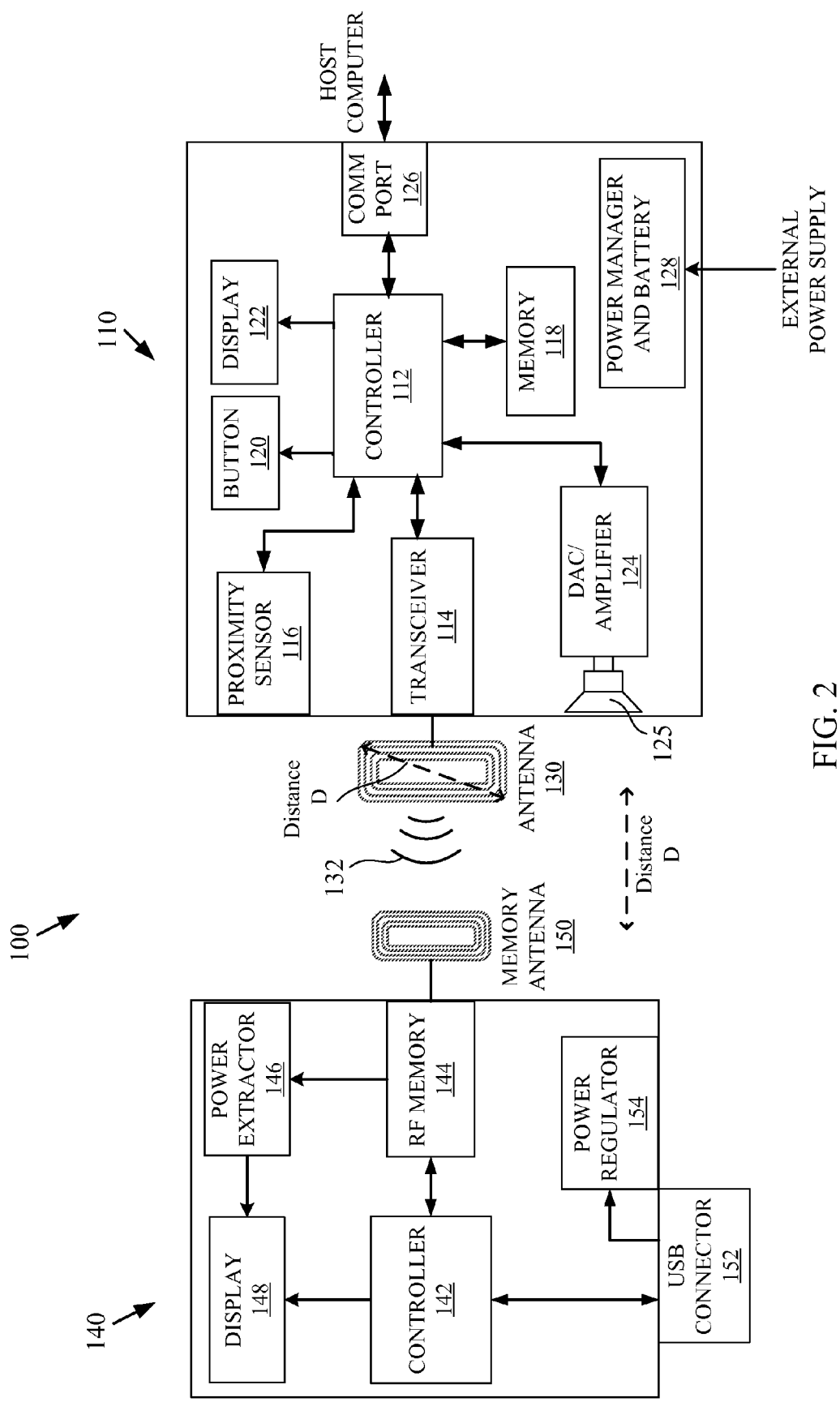
FIG. 2 shows a component diagram of an embodiment of a system including a transmitting device and a receiving device in accordance with the RF-Based System for Close-Proximity Data and Energy Transfer.

Receiving device 50 is a passive RF device that is able to store and retrieve data from transmitting device 20 into its memory, such as RF memory 144 shown in FIG. 2. Receiving device 50 may include a receiving device housing 52 having a cap 54, an LED 56, a memory antenna 58, and a USB connector 60. LED 56 may be a small, low-power LED for indicating memory processes so that the user knows when data transfer has been started, stopped, and completed. Memory antenna 58 performs the functions of an antenna transceiver as well as an RF energy harvester. The RF energy harvested is converted to power for the electronic RF circuits and memory to operate. USB connector 60 is protected by cap 54 and provides an interface with a computer to allow a user to retrieve and view information sent from transmitting device 20.

Although transmitting device 20 is shown in a box configuration and receiving device 50 is shown in a "memory stick" configuration, it should be recognized that the size and shape of transmitting device 20 and receiving device 50 may vary depending upon the particular application desired.

FIG. 2 shows a component diagram of an embodiment of a system 100 including a transmitting device 110 and a receiving device 140 in accordance with the RF-Based System for Close-Proximity Data and Energy Transfer. Transmitting device 110 may correspond to transmitting device 20 shown in FIG. 1, while receiving device 140 may correspond to receiving device 50 shown in FIG. 1.

Transmitting device 110 may include a transmitting device controller 112 and an RF transceiver 114, a proximity sensor 116, and a memory module 118 each connected to transmitting device controller 112. Transmitting device 110 may also include a button 120, transmitting device display 122, digital-to-analog converter (ADC)/amplifier 124, and communications port 126 connected to controller 112. RF transceiver 114 is able to transmit and receive data as well as to emit RF energy. Button 120, transmitting device display 122, and ADC/amplifier 124 allow for a user to interface with transmitting device 110. Button 120 allows a user to select information that the user wishes to transfer and allows the user to control the operations of transmitting device 110.

As an example, transmitting device display 122 may be an LCD display. Transmitting device display 122, ADC/amplifier 124, and a speaker 125 connected to ADC/amplifier 124 help provide audio and visual feedback to the user. Communications port 126 provides an interface between transmitting device 110 and a host computer or a network via a wired or wireless connection. Communications port 126 may be used for accessing data in memory 118 or real-time accessing of data in RF memory 144.

Transmitting device 110 also includes a power manager and battery component 128, which supplies regulated voltage to all electronic circuits in transmitting device 110 for portable applications. Transmitting device 110 may also use an external power source when portability is not desired. When an external power supply is used, power manager and battery component 128 also manages battery charging processes.

Transmitting antenna 130 may be a loop antenna and is connected to RF transceiver 114. The dimension of transmitting antenna 130 determines transmitting range. For example, if transmitting antenna 130 is a loop antenna, the transmitting range is about the diagonal dimension of the loop antenna. As an example, a square loop transmitting antenna 130 has a transmitting range of the distance D. Transmitting antenna 130 may be various shapes, including square, rectangle, and circle, and its size may range from 0.1 to 1 meter. If a large transmitting antenna 130 is used, a high-powered RF transceiver 114 may need to be used.

Receiving device 140 may include a receiving device controller 142 and a receiving device display 148 and RF memory module 144 each connected to receiving device controller 142. As an example, RF memory module 144 may comprise a 64-Kbit dual-interface EEPROM chip, product number M24LR64-R, manufactured by STMicroelectronics Corporation, with headquarters in Geneva, Switzerland. The RF memory module 144 can be accessed in two ways: wireless via memory antenna 150 and wired via controller 142. Receiving device display 148 may be an LCD screen or an LED depending upon the application desired.

Receiving device 140 may also include a power extractor 146 connected to receiving device display 148 and RF memory module 144, as well as a memory antenna 150 connected to RF memory module 144. The memory antenna 150 is also a loop antenna. The diagonal dimension of memory antenna may be less than 0.1 meter and the shape may be various shapes depending upon the boundary of receiving device 140.

Transmitting device controller 112 is configured to simultaneously transfer data, such as audio, video, and binary data, from memory module 118 to RF memory module 144 and RF energy 132 from transmitting antenna 130 to memory antenna 150 when proximity sensor 116 senses that receiving device 140 is within a distance less than or equal to the distance D from transmitting device 110. During the transfer, receiving device 140 is in a passive mode, wherein receiving device 140 does not operate by its own power, but rather operates by energy received from transmitting device 110. During transfer from transmitting device 110, the only components of receiving device 140 that operate are receiving device display 148, power extractor 146, and RF memory 144, with controller 142, power regulator 154, and USB connector 152 being inoperative. After transmission ends, controller 142 is fully operable.

Data transfer may be by two-way communication between transmitting device 110 and receiving device 140. As an example, receiving device 140 sends its identification to transmitting device 110, such identification being contained in RF memory 144, and transmitting device 110 may send to receiving device 140 data that a user desires to have in stored in RF memory 144.

Data transmission time may vary depending on the size of the data transmitted. For example, some applications of system 100 may only require that receiving device 140 be located within distance D of transmitting device 110 for a few seconds. The transmitted data may be stored in RF memory 144 as non-volatile memory until a user of receiving device 140 retrieves or deletes it. As an example, a user may retrieve stored data by plugging USB connector 152 into a computer to download the data and view it on the computer.

Receiving device 140 may be powered via transmitting device 110. In such embodiments, RF memory 144 is configured to convert the RF energy received via memory antenna 150 into power and receiving device controller 142 is configured to use the power. Power extractor 146 is configured to extract a portion of the power to operate receiving device display 148. Receiving device 140 may also be powered via a computer. In such embodiments, USB connector 152 is plugged into a computer, upon which, power regulator 154 is configured to regulate computer power from the computer to receiving device 140.

If power is being transmitted to receiving device 140 through USB connector 152, all of the components of receiving device 140 may be powered for operation. In such a scenario, controller 142 manages the processes that bridge information in RF memory 144 with the computer so that the computer can access the information in RF memory 144. During connection of receiving device 140 to a computer, power extractor 146 may be inoperable.

The ability for receiving device 140 to receive energy from transmitting device 110 or from a computer allows for a small, compact receiving device design, as a power supply is not needed in receiving device 140. Further, no power supply, such as a battery, allows a user to use receiving device 140 without having to worry about recharging the device or replacing a faulty or dead battery.

Systems 10 and 100 may have several applications. For example, transmitting device 110 may be placed near an object viewable to the public, such as an art display. Transmitting device 20 or 110 may be programmed by a user to transmit information such as the artist name, date of birth, city of birth, a biography of the author, and a brief history of the creation of the art displayed. A user carrying a receiving device 50 or 140 may receive such information by flashing the receiving device near to the transmitting device or art display itself if the transmitting device is embedded. The user may need to hold the receiving device near the transmitting device for a few seconds or more depending upon the amount and/or type of data to be transferred.

Figure 3:
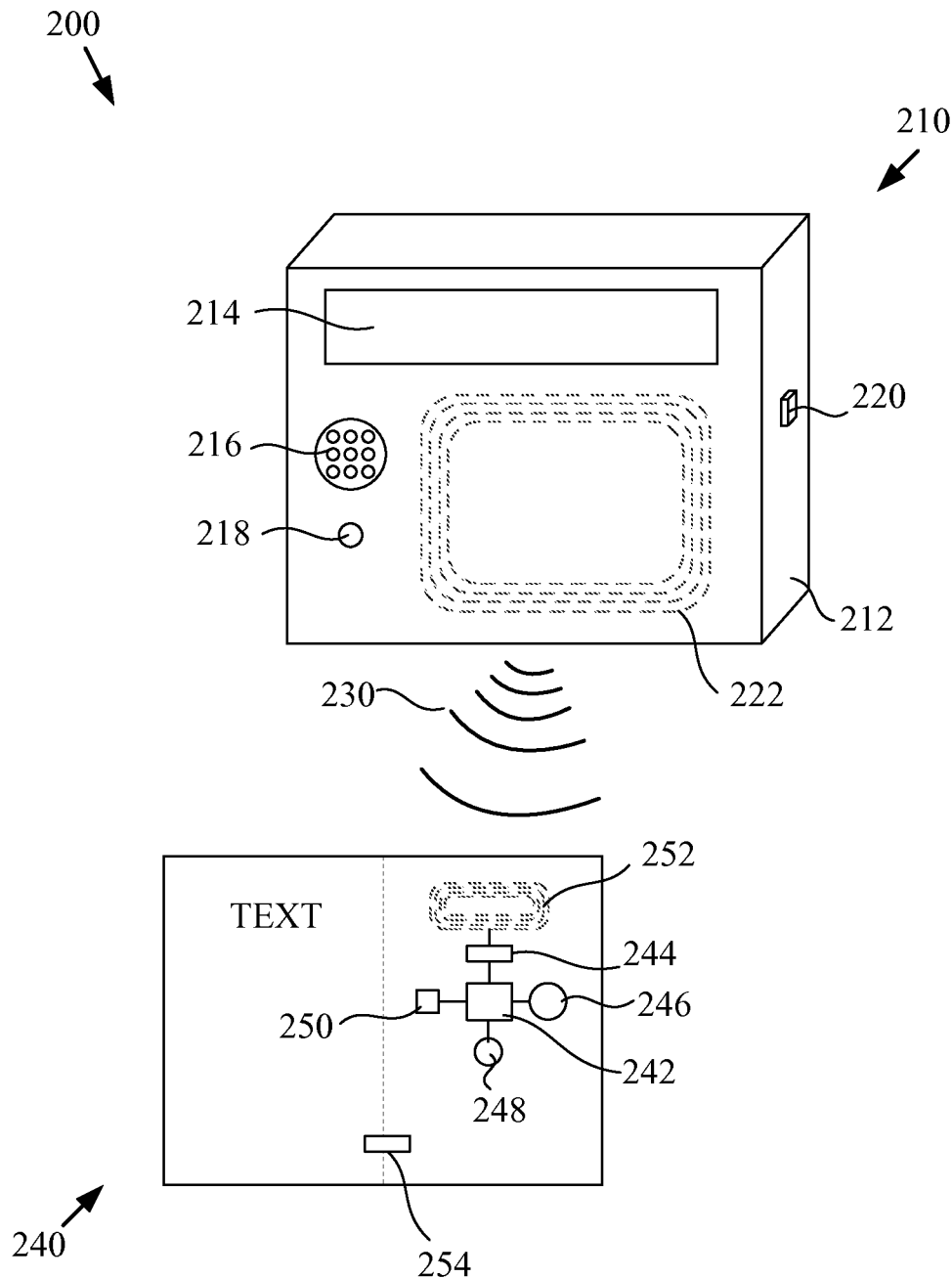
FIG. 3 shows a diagram of another embodiment of a system accordance with the RF-Based System for Close-Proximity Data and Energy Transfer.

FIG. 3 shows a diagram of another embodiment of a system 200 accordance with the RF-Based System for Close-Proximity Data and Energy Transfer. System 200 includes a transmitting device 210 and a receiving device 240. Transmitting device 210 may be configured similarly to transmitting device 20 of FIG. 1 and transmitting device 110 of FIG. 2, and may include a transmitting device housing 212, transmitting device display 214, speaker 216, proximity sensor 218, button 220, and antenna 222. Receiving device 240 includes a controller 242 and an RF memory module 244, speaker 246, and capacitive touch sensor 250 connected to controller 242. Receiving device 240 also includes a battery 248 as well as a memory antenna 252 connected to RF memory module 244.

As an example application, receiving device 240 may be configured as a personalized greeting card with a user-selectable song. In such an embodiment, the aforementioned receiving device 240 components being located on one side of the greeting card and text being located on the other side of the greeting card, as shown. Memory antenna 252 may be printed on the card using conductive ink. Similarly, capacitive touch sensor 250 may also be comprised of conductive ink.

A power switch 254 may be located in the centerline of the greeting card. When a recipient opens the card, power switch 254 is closed and power from battery 248 is delivered to controller 242. Controller 242 then may read and process data from RF memory module 244 and output an analog music signal to speaker 246. Capacitive touch sensor 250 allows a user to select a desired song or interact with voice messages.

The song to be stored in RF memory module 244 and played to a recipient may be selected by a user from interaction with transmitting device 210. For example, transmitting device 210 may be located in a store. A user may use display 214, speaker 216, and button 220 to select a song to be transferred to receiving device 240. The song may then be transferred as RF energy 230 to receiving device 240 through memory antenna 252, and may be stored in RF memory module 244. Receiving device 240 operates in passive mode during the data transmission process.

Figure 4:
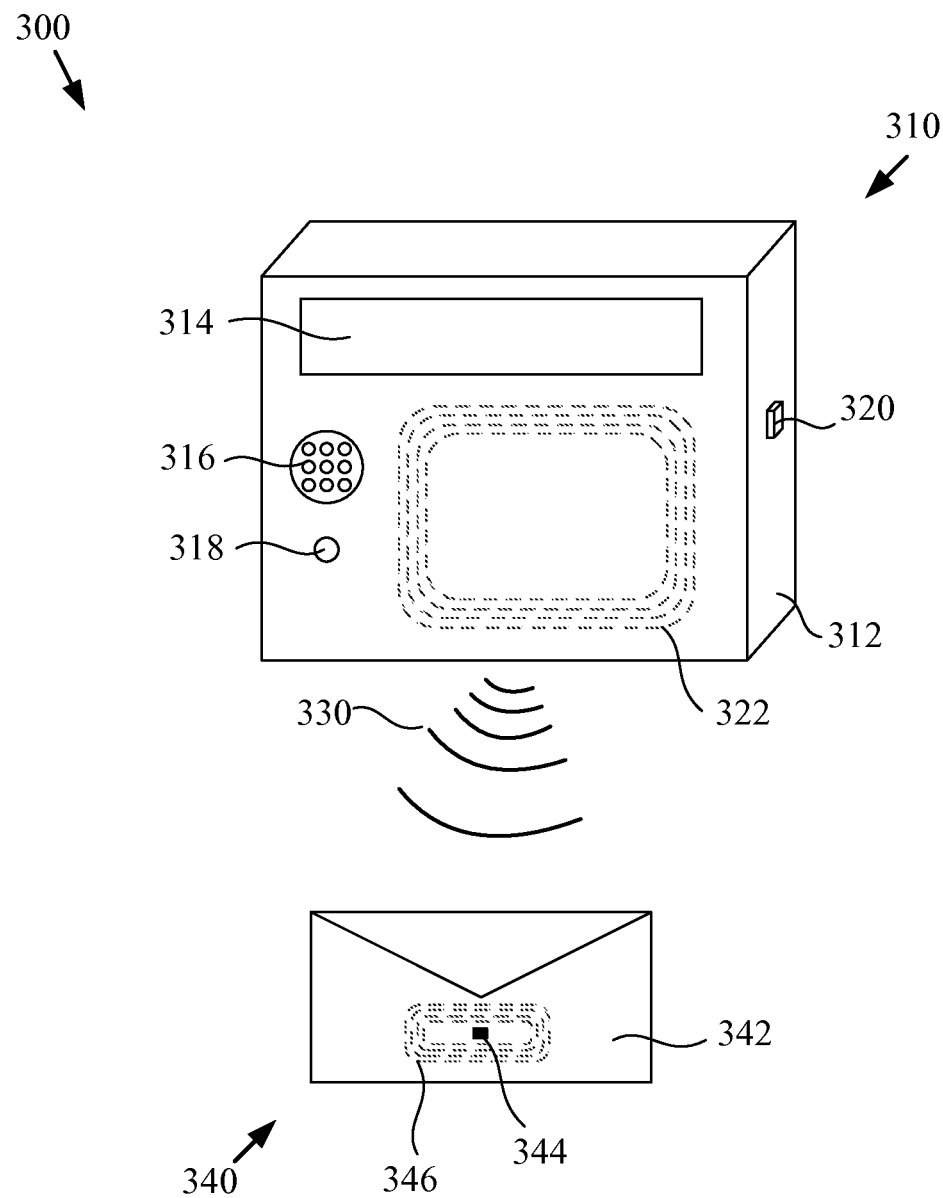
FIG. 4 shows a diagram of another embodiment of a system accordance with the RF-Based System for Close-Proximity Data and Energy Transfer.

FIG. 4 shows a diagram of another embodiment of a system 300 accordance with the RF-Based System for Close-Proximity Data and Energy Transfer. System 300 includes a transmitting device 310 and a receiving device 340. Transmitting device 310 may be configured similarly to transmitting device 20 of FIG. 1 and transmitting device 110 of FIG. 2, and may include a transmitting device housing 312, transmitting device display 314, speaker 316, proximity sensor 318, button 320, and an antenna 322. Receiving device 340 includes a housing 342, RF memory module 344, and memory antenna 346 connected to RF memory module 344. RF memory module 344 may be embedded into housing 342. Memory antenna 346 may be printed on housing 342 using conductive ink.

As an example application, receiving device 340 may be configured as a hybrid paper product. As shown, housing 342 is configured as an envelope. In other embodiments, housing 342 may be a standard sheet of paper, folder, or other paper product. A user may interact with transmitting device 310 to cause video, voice, or other data to be transmitted via RF energy 330 to receiving device 340, with the data received by RF antenna 346 and stored in RF memory module 344. The user may then place an item, such as a letter, within housing 342 and store or mail receiving device 340 to a recipient. As an example, if the document stored within housing 342 is a legal document, the user may store voice or video data within RF memory module 344 that is relevant to the legal document.

Many modifications and variations of the RF-Based System for Close-Proximity Data and Energy Transfer are possible in light of the above description. Within the scope of the appended claims, the embodiments of the systems described herein may be practiced otherwise than as specifically described. The scope of the claims is not limited to the implementations and the embodiments disclosed herein, but extends to other implementations and embodiments as may be contemplated by those having ordinary skill in the art.

I claim:

1. A system comprising:
   a transmitting device comprising
      a transmitting device controller and an RF transceiver, a proximity sensor, and a memory module each connected to the transmitting device controller, and
      a transmitting antenna connected to the RF transceiver, the transmitting antenna having a diagonal dimension of a distance D; and
   a receiving device comprising
      a receiving device controller,
      an RF memory module connected to the receiving device controller, and
      a memory antenna directly connected to the RF memory module
   wherein the transmitting device controller is configured to simultaneously transfer data from the memory module to the RF memory module and RF energy from the transmitting antenna to the memory antenna when the proximity sensor senses the receiving device within a distance less than or equal to the distance D from the transmitting device, wherein the receiving device controller is inoperative during the transfer of data and RF energy from the transmitting antenna, wherein the RF memory module is configured to convert the RF energy received via the memory antenna into power, wherein the receiving device controller is configured to use the power after the transfer of data and RF energy from the transmitting antenna is complete.

2. The system of claim 1, wherein the receiving device further comprises:
   a receiving device display connected to the receiving device controller; and
   a power extractor connected to the receiving device display and RF memory module, the power extractor configured to extract a portion of the power from the RF memory module to operate the display.

3. The system of claim 1, wherein the receiving device further comprises:
   a universal serial bus (USB) connector connected to the receiving device controller; and
   a power regulator connected to the USB connector, wherein when the USB connector is plugged into a computer, the power regulator is configured to regulate computer power from the computer to the receiving device.

4. The system of claim 1 further comprising:
   a button, a transmitting device display, and an amplifier each connected to the transmitting device controller; and
   a speaker connected to the amplifier.

5. The system of claim 1, wherein the receiving device further comprises:
   a speaker, a battery, and a capacitive touch sensor each connected to the receiving device controller; and
   a power switch located within a housing of the receiving device, wherein when the power switch is closed the battery provides power to the receiving device controller.

6. The system of claim 1, wherein the data comprises audio data.

7. The system of claim 1, wherein the data comprises video data.

8. A system comprising:
   a transmitting device comprising
      a transmitting device controller and an RF transceiver, a proximity sensor, and a memory module each connected to the transmitting device controller, and
      a transmitting antenna connected to the RF transceiver, the transmitting antenna having a diagonal dimension of distance D; and
   a receiving device comprising
      a receiving device controller and a receiving device display and RF memory module each connected to the receiving device controller,
      a power extractor connected to the receiving device display and RF memory module, and
      a memory antenna directly connected to the RF memory module
   wherein the transmitting device controller is configured to simultaneously transfer data from the memory module to the RF memory module and RF energy from the transmitting antenna to the memory antenna when the proximity sensor senses the receiving device within a distance less than or equal to the distance D from the transmitting device, wherein the receiving device controller is inoperative during the transfer of data and RF energy from the transmitting antenna, wherein the RF memory module is configured to convert the RF energy received via the memory antenna into power, wherein the receiving device controller is configured to use the power after the transfer of data and RF energy from the transmitting antenna is complete.

9. The system of claim 8, wherein the power extractor is configured to extract a portion of the power from the RF memory module to operate the display.

10. The system of claim 8, wherein the receiving device further comprises:
    a universal serial bus (USB) connector connected to the receiving device controller; and
    a power regulator connected to the USB connector, wherein when the USB connector is plugged into a computer, the power regulator is configured to regulate computer power from the computer to the receiving device.

11. The system of claim 8 further comprising:
    a button, a transmitting device display, and an amplifier each connected to the transmitting device controller; and
    a speaker connected to the amplifier.

12. A system comprising:
a transmitting device comprising
- a transmitting device controller and an RF transceiver, a proximity sensor, and a memory module each connected to the transmitting device controller, and
- a transmitting antenna connected to the RF transceiver, the transmitting antenna having a diagonal dimension of distance D; and a receiving device comprising
- a receiving device controller and a receiving device display and RF memory module each connected to the receiving device controller,
- a power extractor connected to the receiving device display and RF memory module,
- a memory antenna directly connected to the RF memory module,
- a USB connector connected to the receiving device controller, and
- a power regulator connected to the USB connector, wherein when the USB connector is plugged into a computer, the power regulator is configured to regulate computer power from the computer to the receiving device wherein the transmitting device controller is configured to simultaneously transfer data from the memory module to the RF memory module and RF energy from the transmitting antenna to the memory antenna when the proximity sensor senses the receiving device within a distance less than or equal to the distance D from the transmitting device wherein the receiving device controller is inoperative during the transfer of data and RF energy from the transmitting antenna, wherein the RF memory module is configured to convert the RF energy received via the memory antenna into power and the receiving device controller is configured to use the power after the transfer of data and RF energy from the transmitting antenna is complete, wherein the power extractor is configured to extract a portion of the power to operate the receiving device display.

13. The system of claim 12 further comprising:
a button, a transmitting device display, and a digital-to-analog converter/amplifier connected to the transmitting device controller; and
a speaker connected to the amplifier.

14. The system of claim 12, wherein the data comprises audio data.

15. The system of claim 12, wherein the data comprises video data.

* * * * *